US008704172B2

(12) United States Patent
Baykut

(10) Patent No.: US 8,704,172 B2
(45) Date of Patent: Apr. 22, 2014

(54) EXCITATION OF IONS IN AN ICR-CELL WITH STRUCTURED TRAPPING ELECTRODES

(75) Inventor: Gökhan Baykut, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 1396 days.

(21) Appl. No.: 11/970,125

(22) Filed: Jan. 7, 2008

(65) Prior Publication Data

US 2014/0061458 A1 Mar. 6, 2014

(30) Foreign Application Priority Data

Nov. 23, 2007 (DE) ......................... 10 2007 056 584

(51) Int. Cl.
*G01N 24/14* (2006.01)

(52) U.S. Cl.
USPC ............................ 250/291; 250/290; 250/293

(58) Field of Classification Search
USPC .................................. 250/291–294, 296, 290
See application file for complete search history.

(56) References Cited

U.S. PATENT DOCUMENTS

| | | | | |
|---|---|---|---|---|
| 5,019,706 | A * | 5/1991 | Allemann et al. | 250/291 |
| 8,193,490 | B2 * | 6/2012 | Jertz et al. | 250/293 |
| 2006/0027743 | A1 * | 2/2006 | Franzen et al. | 250/290 |
| 2006/0226357 | A1 * | 10/2006 | Franzen et al. | 250/307 |
| 2007/0040114 | A1 * | 2/2007 | Malek et al. | 250/294 |
| 2007/0278402 | A1 | 12/2007 | Zubarev et al. | |
| 2009/0084948 | A1 * | 4/2009 | Baykut et al. | 250/291 |

* cited by examiner

*Primary Examiner* — David A Vanore
*Assistant Examiner* — Wyatt Stoffa
(74) *Attorney, Agent, or Firm* — Robic, LLP

(57) ABSTRACT

In an ion cyclotron resonance cell, which is enclosed at its ends by electrode structure elements with DC voltages of alternating polarity, longitudinal electrodes are divided so that the ICR measurement cell between the electrode structure elements consists of at least three sections. An excitation of ion cyclotron motions can be performed by applying additional trapping voltages to longitudinal electrodes located closest to the electrode structure elements and introducing ions into the center set of longitudinal electrodes. The ions are then excited into cyclotron orbits by applying radiofrequency excitation pulses to at least two rows of longitudinal electrodes to produce orbiting ion clouds. Subsequently, the additional trapping voltages are removed and an ion-attracting DC voltage is superimposed on the DC voltages. Ions excited to circular orbits can be detected using detection electrodes in the outer ICR cell sections.

13 Claims, 6 Drawing Sheets

EXCITATION OF IONS IN AN ICR-CELL WITH STRUCTURED TRAPPING ELECTRODES

BACKGROUND

The invention relates to embodiments of ion cyclotron resonance cells, of which the ends are covered by electrode structure elements carrying electrostatic voltages of alternating polarity, and it relates to a method for excitation and detection of ions. In ion cyclotron resonance mass spectrometers (ICR-MS) the mass-to-charge ratios m/z of ions are measured using their orbiting motions in a homogeneous magnetic field of high field strength. The orbiting motion can consist of a superposition of cyclotron and magnetron motions. The magnetic field is usually generated by superconducting magnet coils, which are cooled by liquid helium. Currently these magnets offer a useful cell diameter between 6 and 12 centimeters at magnetic fields of 7 to 15 Tesla.

The ion's orbiting frequency is measured in ICR measurement cells, which are located within the homogeneous parts of the magnetic field. The ICR measurement cells usually consist of four longitudinal electrodes, which are parallel to the magnetic field lines in cylindrical configuration and enclose the ICR measurement cell as mantle-like covers, as shown in FIG. 1. Ions introduced into the ICR measurement cell near the axis are brought to orbiting radii by using two of these longitudinal electrodes. During this process, ions of the same mass-to-charge ratio are excited as coherently as possible to obtain a synchronously revolving bundle of ions. The other two electrodes are used to measure the orbiting motion of ions by their image currents induced in the electrodes when the ions fly nearby. One normally speaks of "image currents", although actually the induced "image voltages" are measured. Filling the ions into the ICR measurement cell, ion excitation and ion detection occur in sequential phases of the operation.

Since the ratio m/z of the mass m to the number z of elementary charges of the ions (called in the following "mass-to-charge ratio" or simply "mass") is unknown before the measurement, the excitation of the ions occurs by a mixture of excitation frequencies. It can be a mixture in time with temporally increasing or decreasing frequencies (this is called a "chirp"), or it can be a synchronous mixture of all frequencies, calculated by a computer (this is called a "synch pulse"). The synchronous mixture of the frequencies can be configured by a special selection of phases in a way that the amplitudes of the mixture remain within the dynamic range of the digital to analogue converter that is used to generate the temporal progressions of analog voltages for the mixture.

The image currents induced by the ions in the detection electrodes are amplified, digitized and the circular frequencies they contain investigated using Fourier analysis. The initially measured image current values in a "time domain" are transformed using Fourier analysis into a "frequency domain". Therefore, this type of mass spectrometry is also called the "Fourier transform mass spectrometry" (FTMS). Using the peaks of the signals obtained in the frequency domain, the mass-to-charge ratios of the ions, as well as their intensities are determined subsequently. Due to the extraordinary constancy of the magnetic fields used and due to the high precision of the frequency measurements, an unusually high precision of the mass determination can be achieved. Currently, Fourier transform mass spectrometry is the most precise one of all kinds of mass spectrometry. The precision finally depends on the number of ion circulations which can be covered by the measurement.

The longitudinal electrodes usually form an ICR measurement cell with square or circular cross section. As depicted in FIG. 1, a cylindrical ICR measurement cell usually contains four cylinder mantle segments as longitudinal electrodes. Cylindrical ICR measurement cells are most frequently used, since this represents the most efficient use of the volume in the magnetic field of a circular coil. When tight bundles of ions of one mass closely approach the detection plates, the image currents become more like square waves. The always-observed spread (blurring) of the ion bundle, as well as the selected distance of the ion orbits to the detection electrodes results to a great extent in sine-shaped image current signals for each ion species. Using these signals, orbiting frequencies, and thus, the masses of ions can easily be determined by Fourier analysis.

Since the ions can freely move in the direction of the magnetic field lines, the ions, which after the introduction into the cell possess velocity components in direction of the magnetic field, must be hindered from exiting the cell. Therefore, the ICR measurement cells are equipped at both ends with electrodes, the so called "trapping electrodes", in order to avoid ion losses. In classical embodiments, these electrodes carry DC voltages, which repel ions in order to keep them in the ICR measurement cell. Very different forms of this pair of trapping electrodes exist. In the simplest case, these are planar electrodes with a central hole. The hole is for the introduction of ions into the ICR measurement cell. In other cases, additional electrodes are placed outside the ICR measurement cell in form of cylinder mantle segments, which are basically the continuation of the internal cylinder mantle segments of the ICR cell and carry the trapping voltages. Hence, an open cylinder is formed without the end walls. These are called "open ICR cells".

Both inside the open cells and inside the cells with end electrodes, the ion-repelling potentials of the trapping electrodes form a potential well with a parabolic potential profile along the axis of the ICR measurement cell. The potential profile only weakly depends on the shape of the trapping electrodes. The potential profile shows a minimum exactly at the center of the cell, if the repelling potentials are equally high at the trapping electrodes on both sides. Since the ions introduced into the cell have velocities in axial direction, they perform axial oscillations inside this potential well. These movements are called the "trapping oscillations". The amplitude of these oscillations depends on the kinetic energy of the ions.

Different methods exist for introducing ions into the ICR measurement cell and capturing them inside the cell, e.g. the "sidekick" method or a method with dynamic increase of the potential, which however will not be discussed here in further detail. The person skilled in the art knows these methods.

The electric field outside the axis of the ICR measurement cell is more complicated. Due to the potentials of the trapping electrodes located at both ends, it inevitably contains electrical field components in radial direction, which generate a second kind of motion of ions during the excitation: the magnetron motion. The magnetron motion is a circular motion around the axis of the ICR measurement cell. It is, however, much slower than the cyclotron motion. After a successful cyclotron excitation the magnetron motion remains much smaller than the cyclotron orbits. The magnetron orbiting makes the centers of the of the cyclotron orbits circle around the axis of the ICR measurement cell, so that the ions describe trajectories of a cycloidal motion.

The superposition of the magnetron and cyclotron motions is actually an unwanted appearance, which leads to a shift of the cyclotron frequency. Additionally, it leads to a decrease of the useful volume of the ICR measurement cell. The measured orbiting frequency $\omega_+$ (the "reduced cyclotron frequency") under exclusion of additional space charge effects, that is, for very low numbers of ions in the ICR measurement cell given as $$\omega_+ = \frac{\omega_c}{2} + \sqrt{\frac{\omega_c^2}{4} - \frac{\omega_t^2}{2}},$$

where $\omega_c$ is the unperturbed cyclotron frequency and $\omega_t$ is the frequency of the trapping oscillation. The trapping oscillation determines the influence of the magnetron circulation on the cyclotron motion.

An ICR measurement cell without magnetron circulation would be of great advantage, as the cyclotron frequency could be directly measured and no corrections would need to be undertaken.

In the patent application publication DE 10 2004 038 661 A (J. Franzen and N. Nikolaev) an ICR measurement cell is described, which is enclosed by trapping electrodes in form of radiofrequency grids. This radiofrequency (RF) grid generates an ion-repelling pseudopotential in its very close vicinity, directly before the grid. However, no electric field exists in areas distant from the grid, i.e. in most of the ICR measurement cell. Thus, the cyclotron motion is not perturbed in this cell. During the excitation, a normal trapping DC voltage is connected to the grid. Therefore a magnetron motion appears for a short time. However, after removal of the trapping DC voltage magnetron motion disappears, so that the only orbiting motion that remains is the cyclotron motion, of which the center is now not exactly on the axis of the ICR measurement cell. It is, however, difficult in this ICR measurement cell to perform an unperturbed homogeneous excitation of ions, since the RF voltage used for the excitation of ions generates an electric RF field that is not equal in all cross sections of the ICR measurement cell along its axis. In addition, the RF voltage irradiated by the trapping grid is also received at the detection electrodes, which significantly disturbs the detection of the tiny image currents.

In the patent application publication DE 10 2004 061 821 A1 (J. Franzen and N. Nikolaev) an improved ICR measurement cell is described, in which the trapping electrodes are not driven with radiofrequency voltage. Instead, a grid made of radial spokes is used. The spokes are connected alternately to positive and negative DC voltages. If the ions fly on their cyclotron radii near the spokes, then they fly through the alternating and strongly inhomogeneous positive and negative fields around the spokes. The alternating attraction and repulsion of the ions leads to a flat zigzag orbit. However, during the repelling the ions are always closer to the grid bars than during the attraction. In time average, this leads to a repelling of ions. This repelling can be seen analogous to the repelling of ions from a wire with radiofrequency voltage. In case of structures of electrodes with RF voltage, a repelling "pseudopotential" is generated. In this case of alternating and strongly inhomogeneous DC potentials, the pseudopotential may be called a "motion-induced pseudopotential". This setup avoids the disturbances of the image current detections by an RF voltage, since only DC voltages are used here. Such a setup to trap ions in an ICR measurement cell with alternately connected DC voltages of different polarity for the generation of the motion induced pseudopotential will be called in the following a "trapping spoke grid".

Other structures can also be used instead of a spoke grid, e.g. a grid consisting of dot-shaped electrode tips. When the tips are connected alternately to positive and negative voltages, also here, a motion-induced pseudopotential is generated, that repels ions. Such a grid made of electrode tips has slight disadvantages when compared with the grid of radial spokes. Nevertheless, the term "trapping spoke grid" should include a grid made of dot shaped electrode tips.

In the ICR measurement cells with trapping spoke grids, a trapping DC voltage is applied to the spokes or to the tips during the capture of ions and during the excitation to larger cyclotron orbits. Consequently, magnetron motions appear during capture and excitation of ions, which again freeze upon removal of these DC voltages and leave ions on their pure cyclotron orbits with centers slightly off the cell axis.

The homogeneous excitation of ions to larger cyclotron orbits can be improved using a special embodiment of the trapping spoke grid with excitation frequency irradiating electrodes scattered between the spokes, as described in the already mentioned patent DE 39 14 838 C2 (M. Allemann and P. Caravatti) for an "infinity cell". However, experiments have shown, that although the complex electrode forms needed do reduce the ion losses in the excitation, they do not satisfactorily show the expected effect of ion repelling during orbiting of the ions due to the modified trapping spoke grid. Therefore, there is still a search on how to combine a clean excitation of ions to larger cyclotron orbits with the repulsing effect of the trapping spoke grid.

The vacuum in the ICR measurement cell has to be as good as possible, because during the measurement of the image currents no collisions of ions with the residual gas molecules should take place. Every collision of an ion with a residual gas molecule gets the ions out of the orbiting phase of the remaining ions with the same specific mass. The loss of the phase homogeneity (coherence) leads to a decrease of image currents and to a continuous reduction of the signal-to-noise ratio, which also reduces the usable time of the detection. For high resolution experiments the time of the detection should be at least some hundreds of milliseconds, ideally some seconds. Thus, a vacuum in the range of $10^{-7}$ to $10^{-9}$ Pascal is required here.

In addition to a bad vacuum, the space charge in the ion cloud extensively influences the measurement. The Coulomb repulsion between the ions of the same polarity and the elastic scattering of the ions traveling with a cloud by the ions in the passed other clouds lead to multiple disturbances. As a result of these disturbances the ion cloud undergoes a radial expansion, it rotates and spreads out. In addition to the effects of pressure, in contemporary instruments, space charge is the most significant limitation to the achievement of a high mass precision. The space charge leads to a shift of the circular frequencies, which cannot be taken into account by just a simple mass calibration. Also, a control of the number of the ions filled into the ICR measurement cell only helps under certain conditions. The experience always shows that it is not only the number of ions within the ICR measurement cell which influences the shift of the frequencies, but it is also the distribution of the charges over different masses and different charge state of ions. Thus, the shift of the orbiting frequencies does not only depend on the total intensity of the space charge, but also on the composition of the ion mixture.

In the patent application DE 10 2007 047 075.6 (G. Baykut and R. Jertz) a method of operating an ICR measurement cell is described, where the orbiting frequencies become widely independent of the space charge. By applying here a slightly attractive net potential, the ions are pulled closer to the trapping spoke grid. In this method of operation the space charge in the cell can be changed by a factor of hundred without causing a change in the measured orbiting frequency. If a mass calibration is performed in this state of the operation, it would remain valid throughout the following measurements independent of the amount of ions filled into the ICR measurement cell. The reason for this behavior is not yet known.

The image currents of the circulating ions need not necessarily be measured in the longitudinal electrodes of the ICR measurement cell. In adequately shaped cells, ions can also be measured in the end electrodes, as described in the patent application DE 10 2007 017 053.1 (R. Zubarev and A. Misharin). The end electrodes have to be divided in radial segments. This way, some elements carry the trapping voltage and other elements are used for the detection of the image currents.

The detection of the tiny image currents is a challenge for the electrical connections between the detection electrodes and the amplifiers. The conductors must be of extremely low impedance, and should not contain any contacts, of which the contact voltages are temperature dependent. Circuit switches without sufficiently low impedance contacts or those with vibration-dependent resistances are not allowed. Therefore, the detection electrodes cannot be used for other purposes by switching between detection and supplying other voltages. It is proven to be the best, if the detection electrodes are firmly contacted to the amplifier by low impedance solid wires made of silver.

SUMMARY

In accordance with the principles of the invention, in an ICR measurement cell with trapping spoke grids at its ends, the longitudinal mantle electrodes and thus the whole cell are divided into at least three sections, so that, in the middle section, a loss-free excitation of the cyclotron motion like in an "infinity cell" becomes possible. There are switchable generators for at least one additional trapping voltage, which can be applied, in predefined times, at the longitudinal electrodes in the outer sections, in order to keep the ions during the excitation in the middle section. After the excitation, the additional trapping voltage at the longitudinal electrodes in the outer sections is turned off, so that the excited ions can expand up to the trapping spoke grids. Ions excited to circular orbits can be measured using the detection electrodes in the outer sections of the ICR measurement cell. Supplying the trapping spoke grids with an ion-attracting potential, in particular, can draw ions into the outer sections. Thereby, a certain potential value exists, at which the orbiting frequencies of the ions are independent of the space charge.

If three sections are used, then the outer longitudinal electrodes serve as the electrode for the trapping voltage to be applied temporarily. An ion-repelling DC voltage will be applied to at least some of these outer electrodes, so that a potential well forms in the area of the middle longitudinal electrodes. The detection electrodes, which are subsequently used for the detection of the image currents, remain connected to the amplifier. No trapping DC voltage will be applied at any time to these electrodes. After their capture, the ions are held in the middle section by the additional trapping DC voltage. Using a radiofrequency chirp or synch pulse at the excitation electrodes over all three sections along the cell, ions in the middle section are homogeneously and coherently excited, as already described in the U.S. Pat. No. 5,019,706 (M. Allemann and P. Caravatti). The elongated excitation electrodes carry in the middle section only the excitation RF voltage, while in the excitation electrodes in the outer sections the excitation RF voltage is superimposed to the already existing trapping DC voltage.

If five sections are used, then the intermediate trapping voltage is applied to those longitudinal electrodes, which are adjacent to the middle longitudinal electrodes. This way, all longitudinal electrodes of this section can carry the temporary trapping voltage, since none of these electrodes are used for detection of image currents. The image currents are measured in the outermost sections exclusively. The excitation takes place again by a chirp or synch pulse at a series of longitudinal electrodes which span over all five sections.

The trapping spoke grids located at the both ends, which enclose the three or five sections of the ICR measurement cell, are alternately connected to positive and negative DC voltages, so that they represent a motion-induced repulsive pseudopotential for ions on circular orbits. After the excitation, when the ions are on orbits, the additional trapping DC voltage is removed from the corresponding sections, upon which the magnetron motion freezes, the packed-shaped ion clouds move on pure cyclotron orbits, and expand up to the trapping spoke grids on both sides. Ions move in these long packets back and forth and get each time reflected by the trapping spoke grids. If now an additional ion-attracting potential is applied to the trapping spoke grids, then the elongated ion packets divide and the divided packets approach to the trapping spoke grids at both ends of the cell with increasing ion-attracting voltage. At a certain potential value, as described in the already cited patent application DE 10 2007 047 075.6 (G. Baykut and R. Jertz), the orbiting frequencies become independent of the space charge. In this state of independence, the detection of the image currents takes place, either by the longitudinal electrodes of the outermost sections, or at the end plates by the detection electrodes, which are similarly spoke-shaped and placed between the spokes of the trapping spoke grid. If the image currents are measured at the end plates, then, even in an ICR measurement cell with only three sections, the trapping DC voltage can be applied to all outer longitudinal electrodes of the cell.

By applying appropriate voltages, the ion clouds can also be pulled to only one side of the ICR measurement cell and can be measured there.

BRIEF DESCRIPTION OF THE DRAWINGS

In FIG. 3*a* the ions (26) are in the middle section in the range of the longitudinal electrodes (21) and (27). They are trapped by an additional trapping voltage at the electrodes (20, 26, 22, 28) in the middle section, but are not excited to cyclotron orbits.

In FIG. 3*b*, the ions now circle on cyclotron orbits, they have been excited by applying one phase of the exciting radiofrequency pulse to the longitudinal electrodes (20, 21, 22) and by applying the second phase to the longitudinal electrodes (26, 27, 28).

Figure 3A:
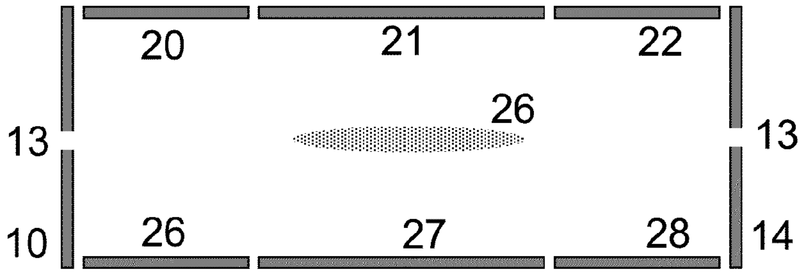
FIGS. 3*a*-3*e* schematically show a few time phases of a measuring method using a system according the present invention as per FIG. 2.
Figure 3B:
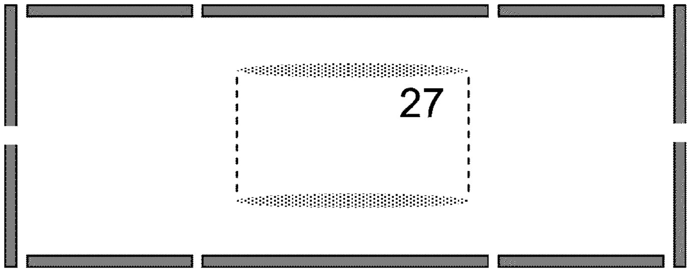
Figure 3C:

Upon removing the additional trapping voltage at the outer longitudinal electrodes (20, 26, 22, 28) the orbiting ion clouds (28) expand up to the trapping spokes grids (10) and (14), as shown in FIG. 3*c*.

Figure 3D:
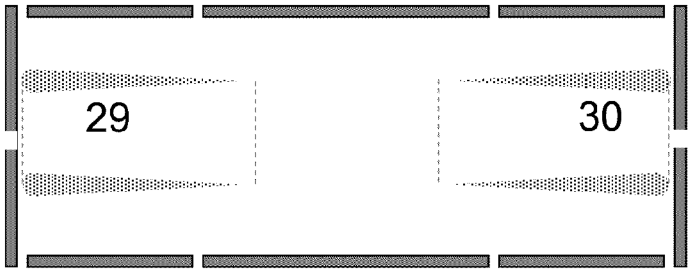

If additional attracting voltages are applied to the trapping spoke grids, as in FIG. 3*d*, then the orbiting ion clouds (28) split into the orbiting ion clouds (29) and (30).

Figure 3E:
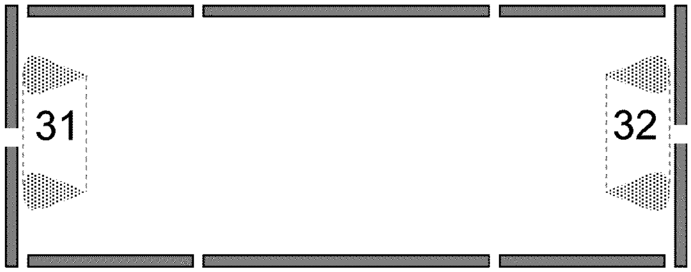

In FIG. 3*e*, the ion clouds (30) and (31) are more strongly split by stronger attracting potentials; they have now achieved a state in which the orbiting frequencies are independent of the space charge. The image currents can now be measured by measuring electrodes at both ends of the ICR measurement cell or by two of the outer mantle electrodes.

Figure 4:
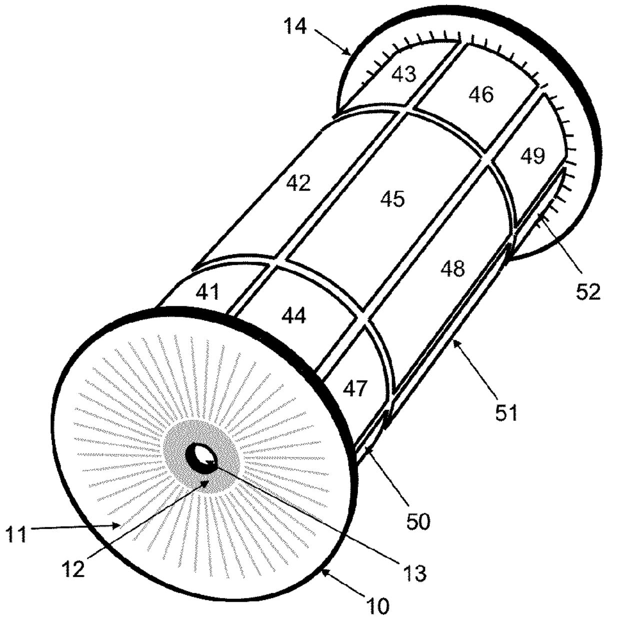

FIG. 4 depicts an ICR measurement cell according to the invention, which, however, has eight longitudinal electrodes in each of the three sections. Thus, four electrodes in the outer sections can be used as detection electrodes, by which the measured frequency is doubled versus the orbiting frequency in favor of the measurement. Besides, the additional trapping voltage can be applied to the other four longitudinal electrodes, by which a more favorably shaped potential distribution results in the middle section. In FIG. 4, elements that correspond to elements shown in FIG. 2 have been given the same reference numeral designations.

Figure 5:
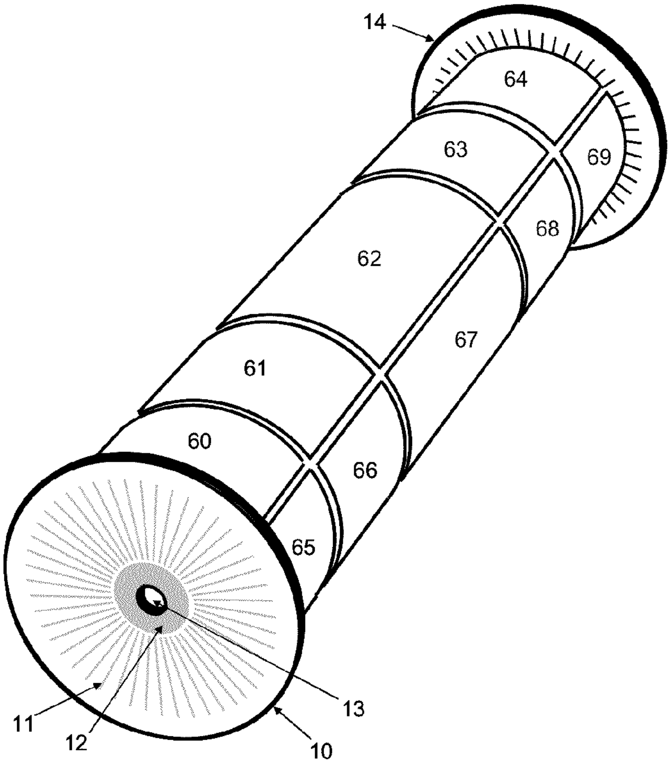
Figure 6A:
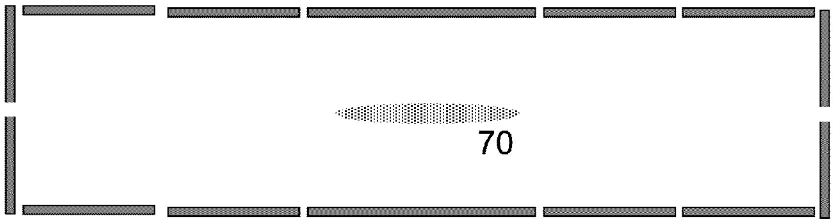
Figure 6B:
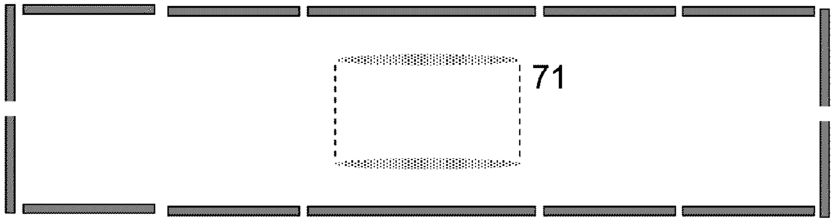
Figure 6C:
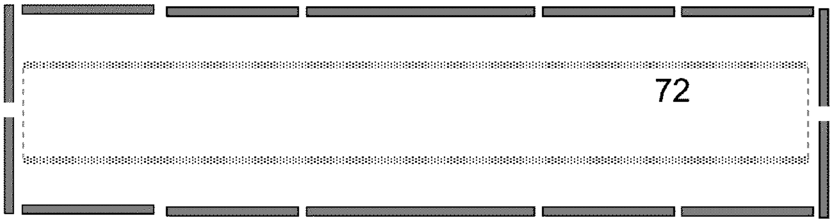
Figure 6D:
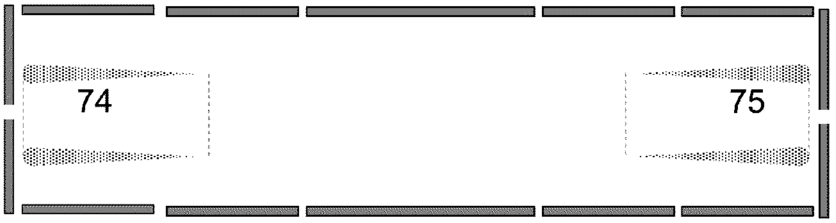
Figure 6E:
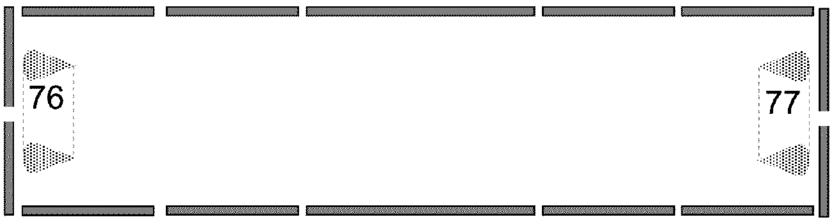

FIG. 5 shows an ICR measurement cell according to the invention with five sections between the trapping spoke grids. The additional trapping voltage can now be applied to all longitudinal electrodes (61, 66, 63, 68) of the sections adjacent to the middle section at predefined times, since none of the longitudinal electrodes of these sections are used for the detection of the image currents. As with FIG. 4, elements in FIG. 5 that correspond to elements shown in FIG. 2 have been given the same reference numeral designations.

FIGS. 6*a*-6*e* depict the shapes of the ion clouds in the time phases from filling into the ICR measurement cell until the detection of the image currents in an ICR measurement cell with five sections. The time phases here are defined analogous to those in FIGS. 3*a*-3*e*.

Figure 7:
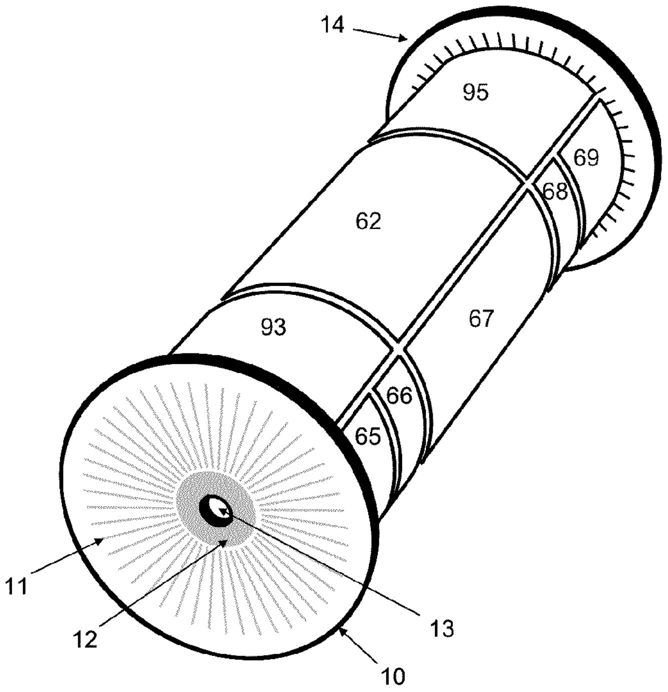

FIG. 7 describes an ICR measurement cell according to the invention. This cell has five sections, but two of the outer excitation electrodes (electrodes 93 and 95) are made as one continuous electrode.

Figure 8:
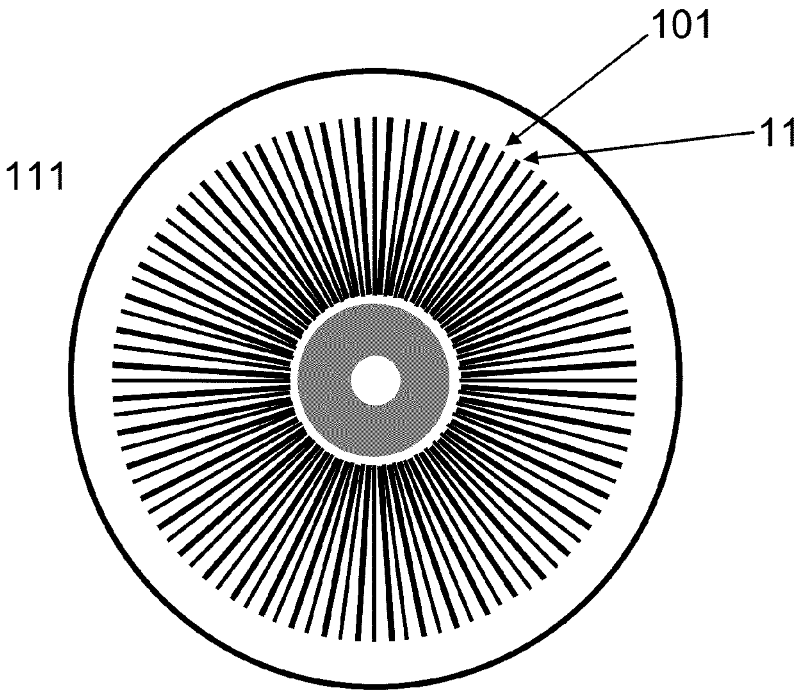

FIG. 8 shows a trapping spoke grid (111), in which 48 detection spokes are placed between 48 potential spokes.

Figure 9:
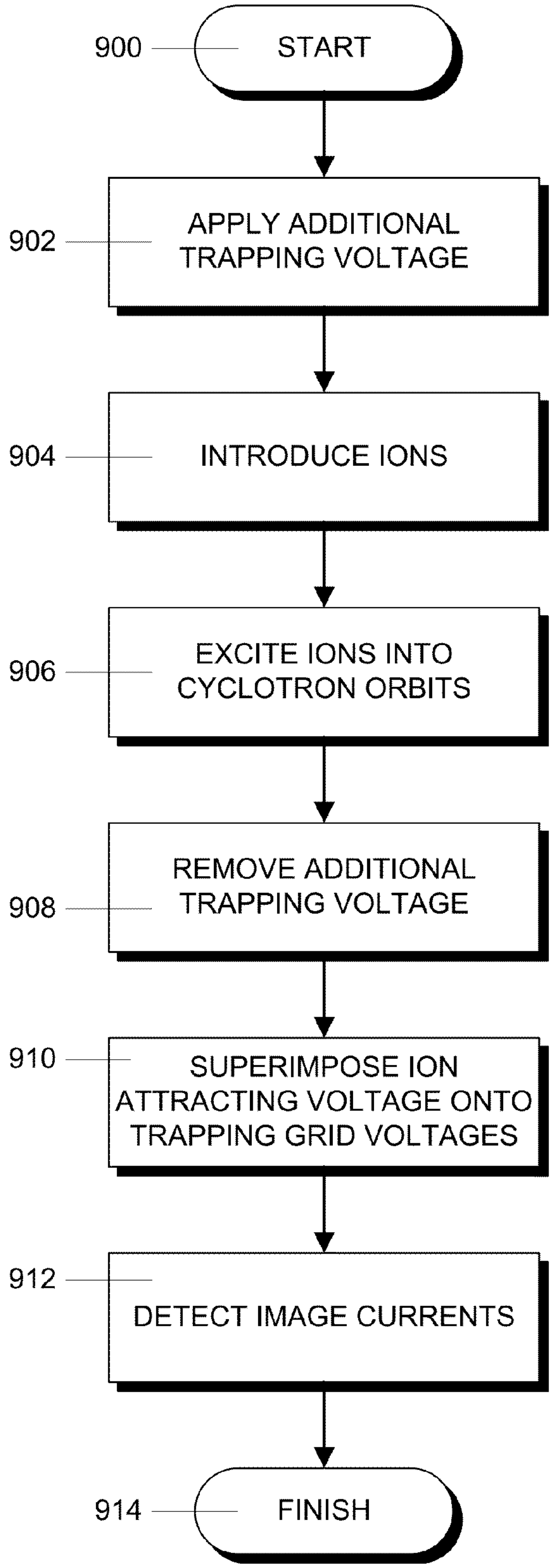

FIG. 9 is a flowchart showing the steps in an illustrative process for measuring mass-to-charge ratios using the apparatus of the invention.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
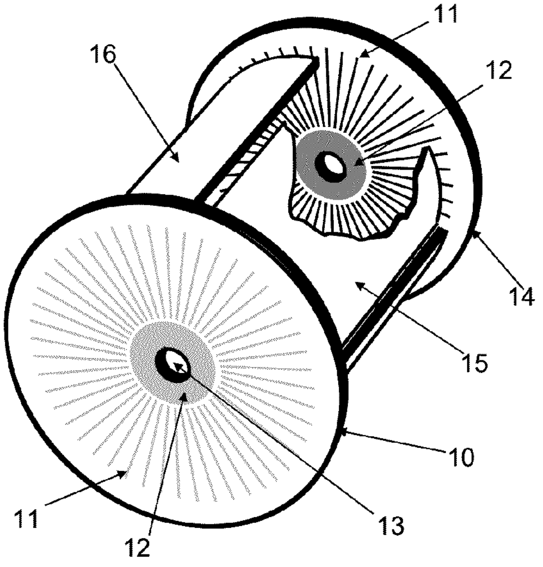
FIG. 1 (Prior Art)
FIG. 1 depicts a cylindrical ICR measurement cell according to the state of the art. Between the two trapping spoke grids (10) and (14) four longitudinal electrodes are located, which have the shape of cylinder mantle segments. Only two of the longitudinal electrodes (15, 16) are visible in the figure. Two opposing longitudinal electrodes of the four have the function to excite the ions to cyclotron orbits and the other two for the detection of the image currents.
Figure 2:
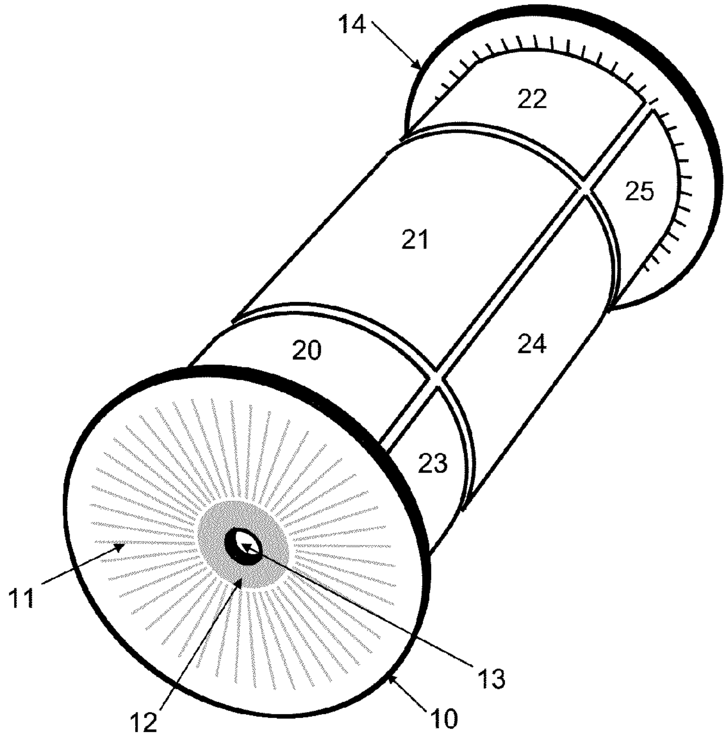
FIG. 2 shows an ICR measurement cell according to the present invention in cylindrical version with three sections between the two trapping spoke grids (10) and (14). The divided longitudinal electrodes are arranged in rows. Only two of the rows (20, 21, 22) and (23, 24, 25) are visible in the figure. The ions are kept in the middle section in the range of the longitudinal electrodes (21) and (24) by applying at times an additional trapping voltage to at least two of the outer longitudinal electrodes. The excitation is performed by a chirp or a synch pulse applied to opposing rows of longitudinal electrodes, i.e. the electrodes of the row (20, 21, 22) and the ones at the opposite side, which are not visible in the figure. Thus, a uniform excitation of all ions is achieved in the middle section.

A simple but already very efficient embodiment is depicted in FIG. 2. There are four rows of divided longitudinal electrodes forming three sections between the two trapping spoke grids (10) and (14), each with the grid spokes (11), a central plate (12) and a central hole (13) for the introduction of ions. Of the four rows only two rows (20, 21, 22) and (23, 24, 25) of the longitudinal electrodes are visible in FIG. 2 due to the perspective depiction. ADC voltage is only applied to the central plate (12) for the initial capture of ions introduced into the cell. The walls of the central hole can be coated e.g. with divided electrodes to permit the "sidekick" method of ion introduction, which is known to a person skilled in the art, to be used.

It will here be assumed that the detection of the image currents will be performed at the end plates using spoke-shaped detection electrodes which are placed between the trapping spokes, as shown in FIG. 8. The process of making a measurement is shown in the flowchart of FIG. 9. This process begins in step 900 and proceeds to step 902 where an additional trapping voltage is applied for capturing and trapping of the ions. The additional trapping voltage can be applied to all eight outer longitudinal electrodes (here only four of them 20, 23, 22, 25 are visible due to perspective reasons), by which the trapping field inside the cell becomes rotationally symmetric. In step 904, ions are introduced into the cell.

In FIGS. 3*a*-3*e*, the shapes of the ion clouds are schematically depicted for five selected time phases of the complete measurement cycle with the ICR measurement cell according to the present invention. FIG. 3*a* shows how the ions (26) are being captured in the middle section in the range of the longitudinal electrodes (21) and (27), which are placed opposite to each other, and kept by the additional trapping voltage at the eight outer longitudinal electrodes (due to the cross sectional illustration only 20, 26, 22, 28 are visible here) in the middle section. The ions are not yet excited to cyclotron orbits and form an elongated elliptic cloud (26) on the axis of the ICR measurement cell. The ions move in the parabolic-shaped trapping potential back and forth along the axis, i.e. perform the trapping oscillations.

In step 906, by applying chirp or sync pulses, ions (27) can now be excited to orbits, as can be seen in FIG. 3*b*. For this, one of the phases of the exciting RF pulse is connected to the longitudinal electrodes (20, 21, 22), and the second phase to the longitudinal electrodes (26, 27, 28). By connecting the RF pulses to a complete row of the longitudinal electrodes each time, an excitation field is created in the middle section which is practically uniform in all cross sections of this middle section of the cell, as already described above in the cited U.S. Pat. No. 5,019,706 (M. Allemann and P. Caravatti). This kind of ICR measurement cell is traditionally called an "infinity cell". Because the excitation field in the middle section is practically the same in each cross section, all ions are uniformly excited to cyclotron orbits. Ions of the individual ion species of the same mass form orbiting ion clouds (27), whereby each ion species forms a cloud with its own orbiting frequency that depends on the mass. Individual ion clouds with different orbiting speeds can pass and penetrate through each other practically undisturbed.

Due to the complicated trapping field that exists in the middle section of the ICR measurement cell, the excitation generates superimposing cyclotron and magnetron motions and forms epicycloidal orbits, where the centers of the large cyclotron orbits circle around the axis of the ICR measurement cell with a much slower magnetron orbiting frequency and smaller radii.

In step 908, the additional trapping voltage is removed. By removing the additional trapping voltage from the outer longitudinal electrodes (20, 26, 22, 28) the ion clouds expand to the trapping spoke grids (10) and (14) as shown in FIG. 3*c*. Inside the ICR, the electric field no longer exists; the ions can sense only in the direct vicinity of the trapping spoke grids a motion induced pseudopotential that reflects them back. At the same time, the magnetron motions freeze. The centers of the cyclotron motion of the ions no longer circles around the axis of the ICR measurement cell, instead, a fixed off-axis orbiting center forms for each ion cloud. Within the ion clouds (28) ions run axially with constant speeds back and forth, and, when they approach the trapping spoke grids, they are reflected.

In addition to the positive and negative DC voltages applied to alternating spokes, in step 910, ion attracting potentials are applied now to the trapping spoke grids. The ion cloud (28) splits into two ion clouds (29) and (30) as depicted in FIG. 3*d*. In FIG. 3*e*, the split ion clouds (30) and (31) are more intensely separated by stronger ion-attracting potentials. Between these two differently strong separations, there is a potential value at which the orbiting frequencies are independent of the space charge, as described in the patent application DE 10 2007 047 075.6 (G. Baykut and R. Jertz). Due to the proximity to trapping spoke grids, between which also the detection electrodes are embedded, the image currents can now be measured exceptionally well in step 912. "End-sided" detection using electrodes positioned at both ends of the cell has also the advantage, that it is not impaired by slightly eccentrically-positioned cyclotron orbits. The process then ends in step 914.

End-sided detection has a further advantage. Image currents, i.e. the currents generated by the image charges in the detection electrodes withdraw energy out of the orbiting ion packets. The amount of the energy withdrawn out of ions depends on the shape and the conductivity of the detection electrodes. The withdrawal of the energy reduces the radius of the cyclotron orbits with time. This leads to a decrease of the image currents during a detection of image currents with the longitudinal mantle electrodes. However, during end-sided detection the measured image currents remain practically the same.

Ions do not need necessarily to be detected by the end electrodes, they can also be detected by longitudinal electrodes at the outer sections, e.g. the longitudinal electrodes (23) and (25) of the FIG. 2 and the electrodes opposite to them, which are not visible in the figure. This kind of detection is slightly disadvantageous, not only due to the eccentric orbits and the decrease of the orbit radii, but also due to a non-rotationally symmetric trapping field before and during the ion excitation process. Since the detection electrodes should preferably not be equipped with switches and therefore not be connected to the trapping voltages in a complicated way, the additional trapping voltage can only be applied at two of the outer longitudinal electrodes, which destroys the cylindrical symmetry of the trapping fields inside the ICR measurement cell.

In order to save the rotational symmetry, the entire detection amplifier can also be held at the trapping voltage at these predefined times. Since detection is only performed after removing the trapping potential from the longitudinal electrodes, such an operation is practical.

A better solution can be achieved using an ICR measurement cell depicted in FIG. 4, which has eight rows, each of them with three longitudinal electrodes. Four of the eight outer longitudinal electrodes can be used here for measuring the image currents. The remaining four outer longitudinal electrodes are used for excitation, as well as to generate the trapping potential. This is still not completely rotationally symmetric, but is better balanced than in the case where only two opposite longitudinal electrodes are used for the additional trapping voltage.

When using longitudinal electrodes in four, six, eight, or more rows the cylinder mantles can be equally wide, but they may also be unequally wide in order to achieve certain field configuration inside the ICR measurement cell. Also conical or trumpet-shaped cylinder mantle segments can be used e.g. for tailoring the trapping field and in order to give a predefined shape to the image current signals.

The measurement of the orbiting ion clouds can be performed in a symmetric or an asymmetric division of the ion clouds in both of the outer sections of the ICR measurement cell. Alternatively, the ions can be pulled to only one side of the cell by using corresponding voltages and can be detected on this side. Such a single sided detection has the advantage that slight inhomogeneities of the magnetic field cannot cause different orbiting frequencies on both sides, which could lead to interferences during a common amplification of the image current signals. Thus, during detection in both of the outer sections, it is of advantage to measure and analyze these image currents separately. This is true for end-sided detections, as well as for the mantle-sided detection.

A more satisfying way is to use an ICR measurement cell consisting of five sections, as described in FIG. 5. After introducing the ions into the middle section, the additional trapping voltage, which has to keep the ions in the middle section, can be applied to the longitudinal electrodes adjacent to the longitudinal electrodes in the middle section. Since here no electrodes serve for the detection of the image currents, the additional trapping voltage can be applied to all of these longitudinal electrodes adjacent to middle section, so that always a rotationally symmetric trapping field appears inside the ICR measurement cell. The shapes of the ion clouds from introduction to the detection are schematically shown in FIGS. 6*a*-6*e*. These figures are analogous to those shown in FIGS. 3*a*-3*e*. When the ion clouds have expanded out to the trapping spoke grids, their image currents can be measured with the end electrodes but also with detection mantle-sided electrodes. The mantle-sided detection electrodes at the outermost section are connected to the amplifier all the time, since they do not need to be connected to the additional trapping voltage.

In FIG. 7 an ICR measurement cell is shown, which actually is equivalent to an ICR cell with five sections. It can also be operated the same way. However, in the row of the excitation electrodes, the outer electrodes (93), (95) are made in an undivided, continuous shape over two sections. This embodiment has less electrical connections than the one with five complete sections as in FIG. 5.

The detection of the image currents can be performed at end-sided electrodes which are placed between the trapping spokes, as shown in FIG. 8. Illustratively, FIG. 8 shows a trapping spoke grid 11 with 48 spokes. The end-sided electrodes also have 48 spokes that are interspersed with the trapping spoke electrodes. This way, a combined trapping-detection spoke grid 111 of 96 spokes can be constructed, in which alternately every second and fourth spoke of trapping electrode spokes is connected to positive and negative voltages used for building up a motion induced pseudopotential.

Between the trapping electrode spokes there are further 48 spokes (101), which can be connected e.g. in groups of 12 detection electrodes together to form four detection electrodes. In some cases, it may be useful to introduce spaces between the detection electrodes. Then, for instance, four detection electrodes may be formed from four groups of spoke electrodes with 10 spokes each, and two spokes between each group remain unconnected. A twofold increased frequency is measured in both cases compared to the orbiting frequency of ions, which—as a known fact—helps achieve an increased mass accuracy.

Two oppositely placed groups each with 12 spokes each (101) can also be used for detection, while the spoke electrodes (101) between them remain unused. In this case, as in the classical ICR measurement cells with two opposite longitudinal detection electrodes, only the simple orbiting frequency is measured.

The detection of image currents by means of electrically-isolated spokes (101) which are connected together at a distance from the trapping electrode, is not advantageous, because the image currents then travel very long distances from one spoke to the next spoke during the detection process. This requires energy, which is removed from the orbiting ion packages. Therefore, it is beneficial to connect the detection spokes to a well-conducting detection block located on, or near, the trapping electrode. The trapping electrode spokes for the generation of the motion-induced pseudopotential are suspended over grooves of the detection block in order to electrically isolate them from the detection block.

The detection of the image current using the end-sided electrodes has the advantage, that the superimposed eccentricity of the cyclotron orbits, which is caused by the initial magnetron motion, leads to no disturbance at the image currents at all. When using the longitudinal electrodes for detection, this eccentricity causes a fluctuation of the image current intensity, since the distances between the ion packets and the detection electrodes change within a single orbiting cycle.

The greatest advantage of the invention is that it combines a coherent and uniform excitation of the ion packets with the detection of the image currents in a state, where the orbiting frequencies of ions are independent of the space charge. Hence, an ICR mass spectrometer with a very high mass precision and mass accuracy can be built. Estimations based on the data obtained up to now suggest that a mass precision of 100 ppb (parts per billion) or better will be achievable during routine operations.

What is claimed is:

1. An ion cyclotron resonance (ICR) measurement cell having an axis and trapping electrodes with trapping spoke grids, of which alternating spokes are connected to positive and negative DC potentials in order to generate a motion-induced pseudopotential, the measurement cell comprising:

at least three sets of longitudinal electrodes spaced along the cell axis between the trapping spoke grids, each set of longitudinal electrodes having a plurality of electrodes positioned radially about the cell axis and the electrodes in each set being aligned longitudinally with electrodes in other sets to form rows of electrodes extending across all sections between the trapping spoke grids;

a radiofrequency generator connected to a plurality of rows of longitudinal electrodes in order to supply excitation pulses to the electrodes so that within the center set of longitudinal electrodes, ions are homogeneously excited to cyclotron orbits; and a switchable DC voltage generator that is connected to longitudinal electrodes located in outer sets and that is configured to generate an additional trapping voltage in the center set during ion excitation and to remove said additional trapping voltage after excitation.

2. The ICR measurement cell of claim 1, further comprising detection spoke electrodes located on the trapping electrodes for detecting ion image currents.

3. The ICR measurement cell of claim 2, wherein the detection spoke electrodes are interspersed with spoke electrodes of the trapping spoke grid.

4. The ICR measurement cell of claim 2, wherein the detection spoke electrodes are connected to a conductive detection block located on the trapping electrode.

5. The ICR measurement cell of claim 2, wherein the ICR measurement cell further comprises an image current amplifier and wherein the detection spoke electrodes are directly connected to the image current amplifier without intermediate switch contacts.

6. The ICR measurement cell of claim 1 wherein at least some of the longitudinal electrodes in sets located closest to the trapping electrodes are detection electrodes.

7. The ICR measurement cell of claim 6, wherein ICR measurement cell further comprises an image current amplifier and wherein the detection electrodes are directly connected to the image current amplifier without intermediate switch contacts.

8. The ICR measurement cell of claim 1, further comprising a second DC voltage generator connected to spokes of the trapping spoke grid in order to generate an ion-attracting potential.

9. The ICR measurement cell of claim 1, wherein there are three sets of longitudinal electrodes spaced along the cell axis between the trapping spoke grids.

10. The ICR measurement cell of claim 1, wherein there are five sets of longitudinal electrodes spaced along the cell axis between the trapping spoke grids.

11. The ICR measurement cell of claim 1, wherein there are more than three sets of longitudinal electrodes and wherein at least some longitudinal electrodes of adjacent electrode sets are electrically connected to each other to form a continuous electrode.

12. A method for the measurement of mass-to-charge ratios of ions in an ion cyclotron resonance (ICR) measurement cell having an axis, trapping electrodes with trapping spoke grids, of which alternating spokes are connected to positive and negative DC potentials in order to generate a motion-induced pseudopotential and at least three sets of longitudinal electrodes spaced along the cell axis between the trapping spoke grids, each set of longitudinal electrodes having a plurality of electrodes positioned radially about the cell axis and the electrodes in each set being aligned longitudinally with electrodes in other sets to form rows of electrodes extending across all sections between the trapping spoke grids, comprising:

a) applying an additional trapping voltage to sets of longitudinal electrodes located closest to the trapping electrodes, so that a minimum trapping potential is created in a center set of longitudinal electrodes centered between the trapping electrodes;

b) introducing ions into the center set of longitudinal electrodes;

c) exciting the ions into cyclotron orbits by applying radiofrequency excitation pulses to at least two rows of longitudinal electrodes to produce orbiting ion clouds;

d) removing the additional trapping voltage applied to sets of longitudinal electrodes located closest to the trapping electrodes to allow the orbiting ion clouds to expand across the ICR measuring cell near to the trapping spoke grids; and e) detecting the image currents of the ions.

13. The method of claim 12 further comprising, before step (e), superimposing an ion-attracting DC voltage to the DC potentials applied to the trapping spoke grids, so that the ions are collected gather in front of at least one of the trapping spoke grids.

* * * * *